United States Patent
Veldkamp et al.

(10) Patent No.: US 11,686,291 B2
(45) Date of Patent: Jun. 27, 2023

(54) METHOD OF MOUNTING BLADES TO A ROTOR HUB OF A WIND TURBINE

(71) Applicant: General Electric Renovables Espana, S.L., Barcelona (ES)

(72) Inventors: Bart Veldkamp, Salzbergen (DE); Till Hoffmann, Salzbergen (DE); Jacob Johannes Nies, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/573,009

(22) Filed: Jan. 11, 2022

(65) Prior Publication Data
US 2022/0260056 A1  Aug. 18, 2022

(30) Foreign Application Priority Data

Jan. 12, 2021 (EP) .................................. 21151128

(51) Int. Cl.
*B23P 15/04* (2006.01)
*F03D 13/10* (2016.01)
*F03D 1/06* (2006.01)

(52) U.S. Cl.
CPC .............. *F03D 13/10* (2016.05); *B23P 15/04* (2013.01); *F03D 1/0658* (2013.01); *F05B 2230/60* (2013.01)

(58) Field of Classification Search
CPC ........ F03D 13/10; F03D 1/0658; B23P 15/04; F05B 2230/60; F05B 2240/302; Y02E 10/72; Y02P 70/50
See application file for complete search history.

(56) References Cited

U.S. PATENT DOCUMENTS

| | | | |
|---|---|---|---|
| 2,714,264 A | 8/1955 | Odell | |
| 7,708,523 B2* | 5/2010 | Sakaue | ................... F03D 13/10 416/244 R |
| 8,191,721 B2* | 6/2012 | Hansen | ................... F03D 13/10 212/167 |

(Continued)

FOREIGN PATENT DOCUMENTS

| | | |
|---|---|---|
| DE | 102009011603 A1 | 9/2010 |
| EP | 2650537 A1 | 10/2013 |

(Continued)

OTHER PUBLICATIONS

European Search Report Corresponding to EP21151128.2 dated Jun. 17, 2021.

*Primary Examiner* — Ryan J. Walters
(74) *Attorney, Agent, or Firm* — Dority & Manning, P.A.

(57) ABSTRACT

A method (100) of mounting blades (22) to a rotor hub (20) of a wind turbine (10), the wind turbine (10) comprising a tower (12), a nacelle (16) mounted on the tower (12), the rotor hub (20) being coupled to the nacelle (16), and blades (22), each blade (22) comprising a blade root segment (56) and a blade extension segment (66), the method (100) comprising mounting a first blade root segment (50) to the rotor hub (20), mounting a second blade (72) to the rotor hub (20) after mounting the first blade root segment (50), the second blade (72) comprising a second blade root segment (52) and a second blade extension segment (62), and connecting a first blade extension segment (60) to the first blade root segment (50) after mounting the second blade (72).

15 Claims, 6 Drawing Sheets

(56) References Cited

U.S. PATENT DOCUMENTS

| | | |
|---|---|---|
| 9,470,208 B2 | 10/2016 | Nies |
| 9,790,926 B2 | 10/2017 | Canedo Pardo |
| 9,810,202 B2 | 11/2017 | Falkenberg et al. |
| 9,890,763 B2 | 2/2018 | Canedo Pardo et al. |
| 10,054,106 B2 | 8/2018 | Gil Molla et al. |
| 10,677,215 B2 | 6/2020 | Hayden et al. |
| 10,830,204 B2 | 11/2020 | Neumann et al. |
| 2004/0253109 A1 | 12/2004 | Wobben |
| 2005/0019166 A1* | 1/2005 | Bervang ............. B66C 13/08 |
| | | 416/244 A |
| 2011/0206510 A1 | 8/2011 | Langen et al. |
| 2013/0076042 A1 | 3/2013 | Amano et al. |
| 2013/0272876 A1 | 10/2013 | Falkenberg et al. |
| 2015/0204193 A1 | 7/2015 | Anasis et al. |
| 2016/0327019 A1 | 11/2016 | Tobin et al. |
| 2017/0114772 A1 | 4/2017 | Neumann |
| 2018/0274521 A1 | 9/2018 | Akhtar et al. |

FOREIGN PATENT DOCUMENTS

| | | |
|---|---|---|
| EP | 2924283 A1 | 9/2015 |
| EP | 2924284 A1 | 9/2015 |
| EP | 3098439 A1 | 11/2016 |
| EP | 2924284 B1 | 5/2017 |
| EP | 3456957 A1 | 3/2019 |
| EP | 3581790 A1 | 12/2019 |
| JP | 4547039 B1 | 9/2010 |
| KR | 101400205 B1 | 5/2014 |
| KR | 101607691 B1 | 3/2016 |
| WO | WO2010/078944 A2 | 7/2010 |
| WO | WO2014/076825 A1 | 5/2014 |
| WO | WO2019/001665 A1 | 1/2019 |

\* cited by examiner

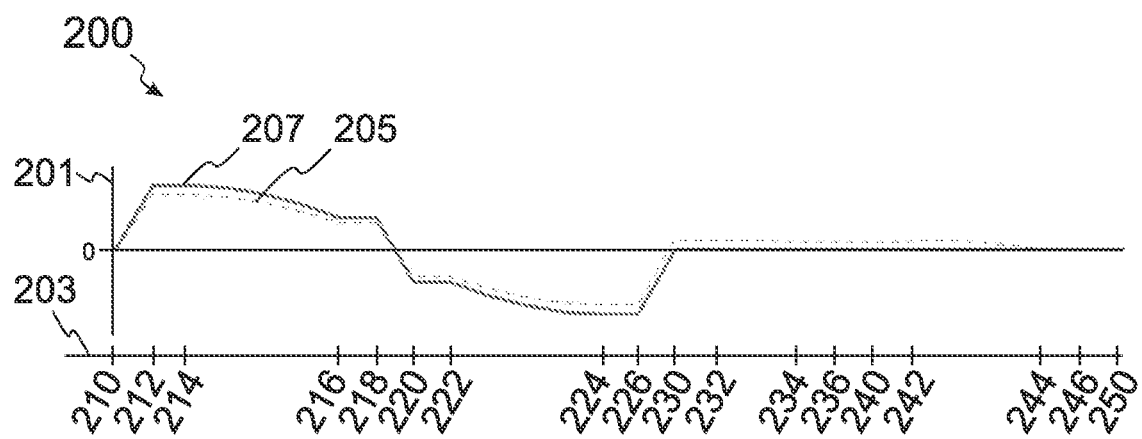
FIG. 5
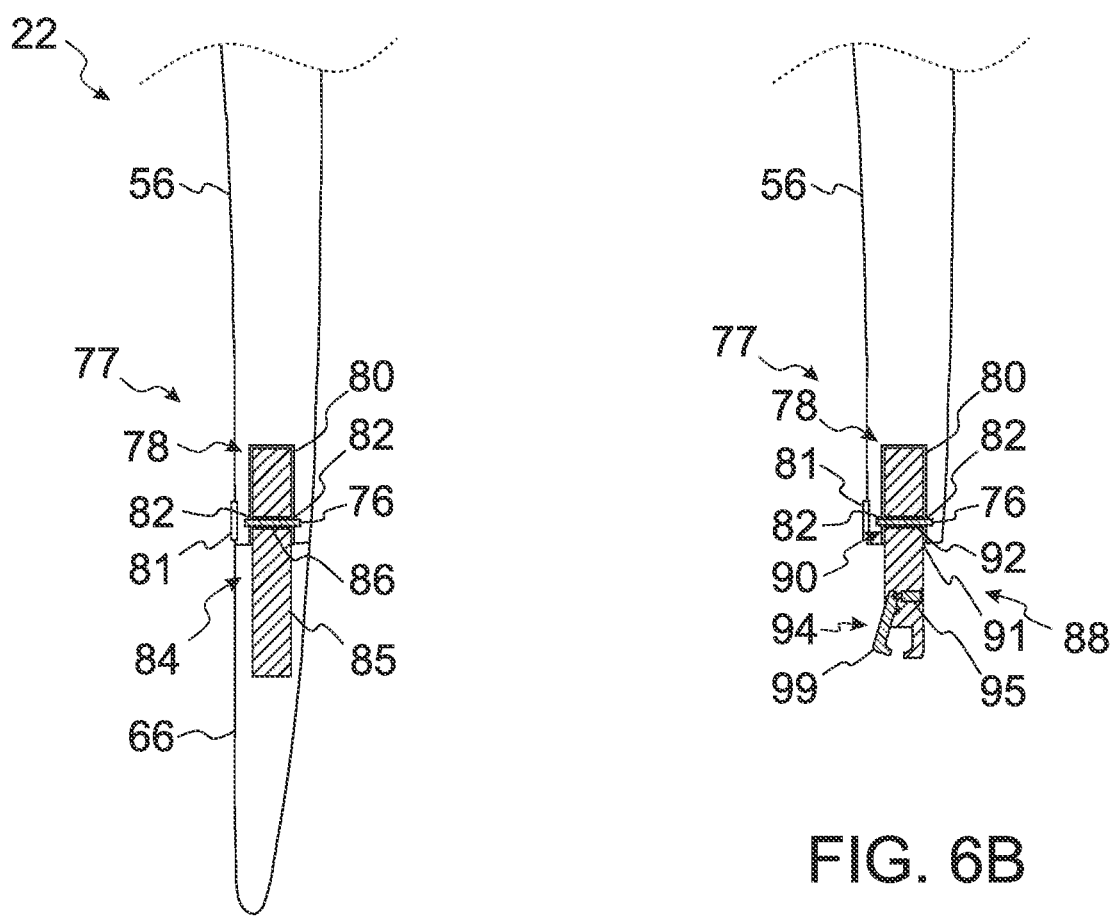
FIG. 6A
FIG. 6B

METHOD OF MOUNTING BLADES TO A ROTOR HUB OF A WIND TURBINE

FIELD

The present disclosure relates generally to wind turbines, and more particularly to a method of mounting blades to a rotor hub of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The size of rotor blades contributes to the energy efficiency of wind turbines. In particular, an increase in rotor blade size can increase the energy production of a wind turbine. The economic benefits of increased wind turbine sizes or rotor blade sizes must be weighed against respective costs of manufacturing, transporting, assembly or repair of the wind turbines. Often, the assembly of a wind turbine involves mounting a rotor hub of the rotor to the nacelle on top of the tower, and installing each rotor blade individually to the rotor hub using a crane. For installing the individual blades, the rotor hub is conventionally rotated multiple times, for example such that each blade can be installed in a horizontal orientation.

During such an installation procedure, the gearbox and other components are subjected to extreme torsional moments. Further, a driving tool for rotating an incomplete rotor with only one or two blades may be required to handle extreme loads during rotation of the incomplete rotor. Additionally, the blades may only be mounted at very low wind conditions to prevent wind loads from increasing a rotor imbalance of the incomplete rotor. However, with increasing wind turbine size or blade size, the extreme loads are increasingly driving the design and/or costs of the gearbox, of other components subject to extreme torsional moments during installation, or of the driving tool. Further, installation may be possible only at ever lower wind speeds, particularly limiting field operations to tight weather windows.

Accordingly, the present disclosure is directed to a method of mounting blades to a rotor hub of a wind turbine that may provide handling of extreme loads or extreme torsional moments during blade installation and/or provide a cost-efficient blade installation.

BRIEF DESCRIPTION

Aspects and advantages of the invention will be set forth in part in the following description, or may be obvious from the description, or may be learned through practice of the invention.

In one aspect, the present disclosure is directed to a method of mounting blades to a rotor hub of a wind turbine, the wind turbine including a tower, a nacelle mounted on the tower, the rotor hub being coupled to the nacelle, and blades, each blade including a blade root segment and a blade extension segment. The method includes mounting a first blade root segment to the rotor hub, mounting a second blade to the rotor hub after mounting the first blade root segment, the second blade including a second blade root segment and a second blade extension segment, and connecting a first blade extension segment to the first blade root segment after mounting the second blade. It should be understood that the method may further include any of the additional steps and/or features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 illustrates a graph of moments acting on the main shaft during conventional mounting of blades and during mounting of blades according to embodiments described herein;

FIG. 6A illustrates a schematic sectional view of a blade extension segment connected to a blade root segment according to embodiments;

FIG. 6B illustrates a schematic sectional view of a hook coupling device connected to a blade root segment according to embodiments.

DETAILED DESCRIPTION

Figure 1:
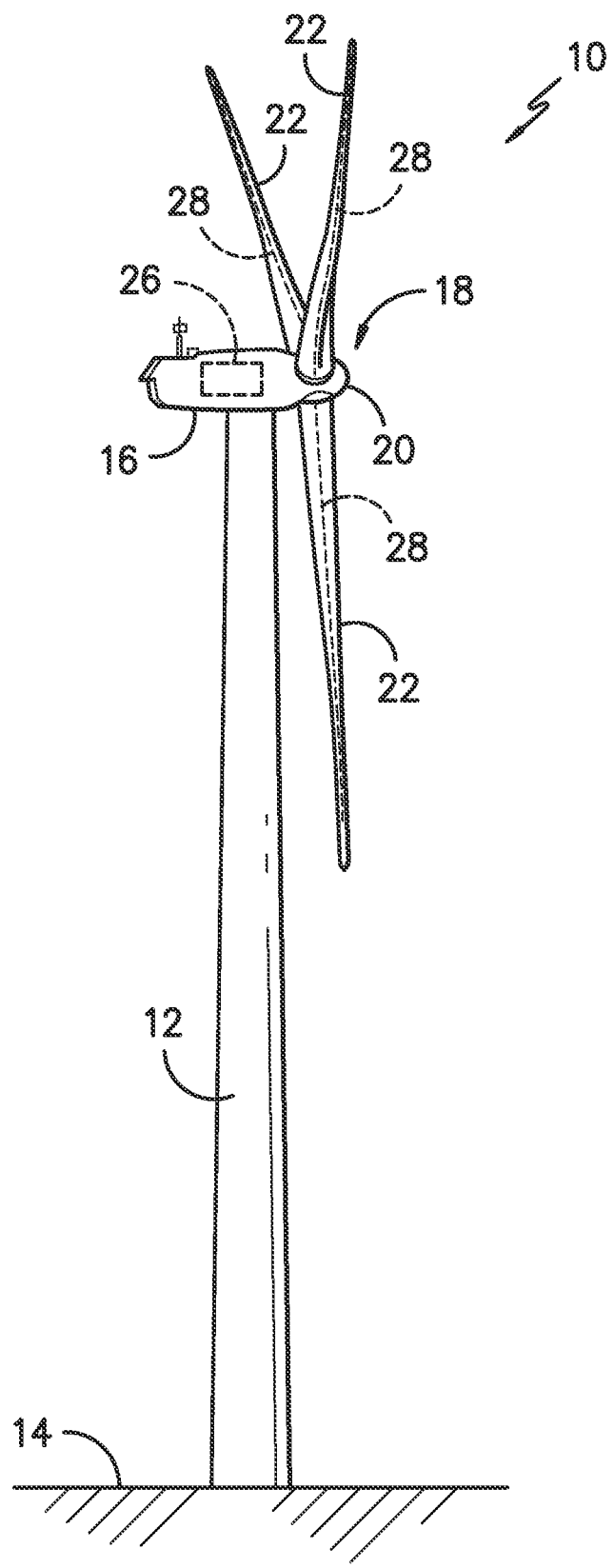
FIG. 1 illustrates a perspective view of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a wind turbine 10 according to the present disclosure. As shown, the wind turbine 10 generally includes a tower 12 extending from a support surface 14 (for example ground), a nacelle 16 mounted on the tower 12, and a rotor 18 coupled to the nacelle 16.

As shown in FIG. 1, the rotor 18 includes a rotatable rotor hub 20 and at least one blade 22 coupled to and extending outwardly from the rotor hub 20. For example, in the illustrated embodiment, the rotor 18 includes three blades 22. However, in an alternative embodiment, the rotor 18 may include more or less than three blades 22. Each blade 22 may be spaced about the rotor hub 20 to facilitate rotating the rotor 18 to enable kinetic energy to be transferred from the wind into usable mechanical energy, and subsequently, electrical energy. For instance, the rotor hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
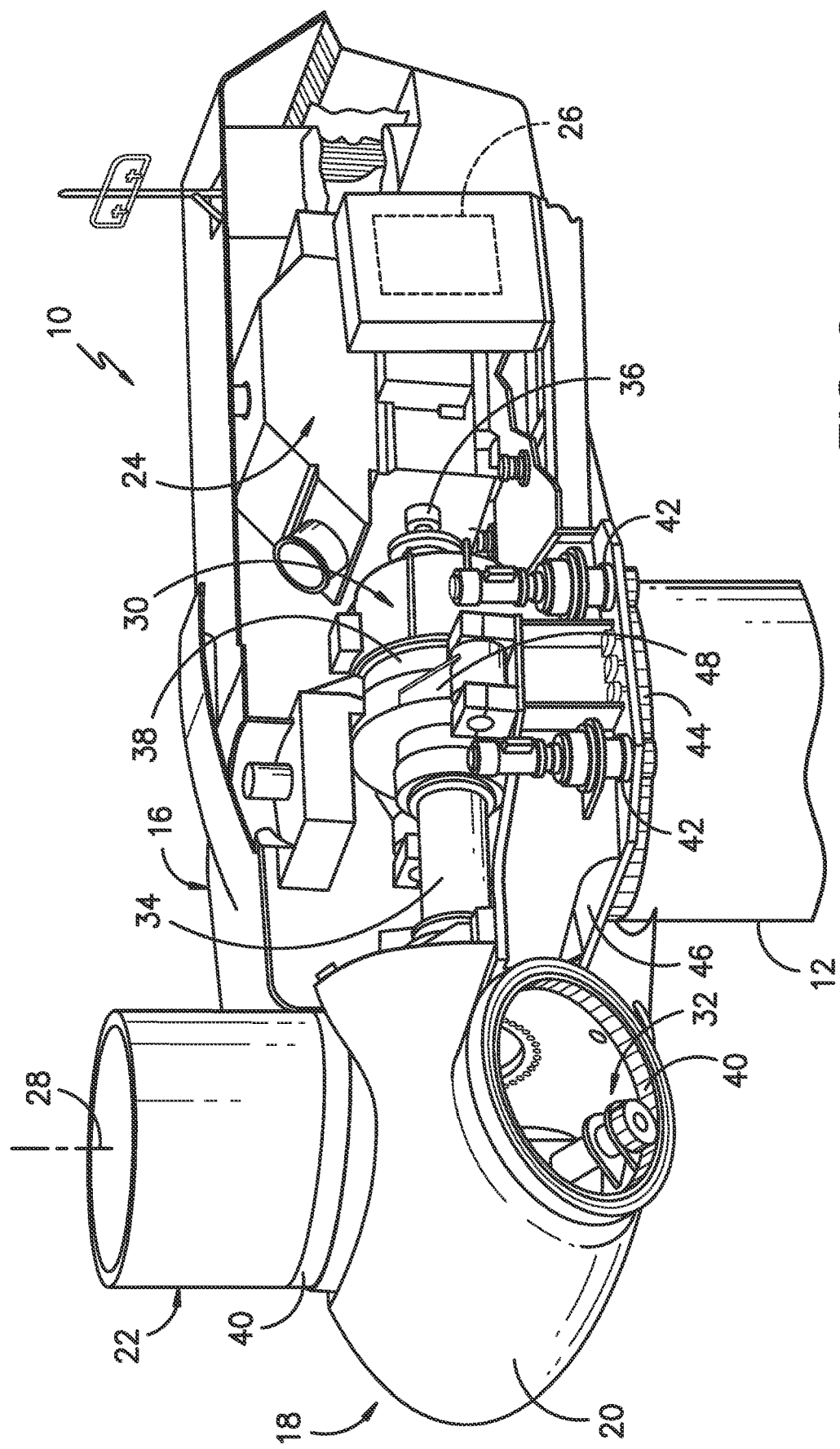
FIG. 2 illustrates a simplified, internal view of a nacelle of a wind turbine, particularly illustrating the nacelle during normal operation.

Referring now to FIG. 2, a simplified, internal view of the nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the rotor hub 20. Thus, the gearbox 30 converts the low speed, high torque input to a high speed, low torque output to drive the gearbox output shaft 36 and, thus, the generator 24.

Each blade 22 may also include a pitch adjustment mechanism 32 configured to rotate each blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

Mounting of the blades for assembly or repair of the wind turbine often involves extreme torsional moments acting on the gearbox or other components, or extreme loads to be handled by a driving tool driving the rotor from one angular position to another angular position. As such, the present disclosure is directed to a method of mounting blades to a rotor hub of a wind turbine that can allow for the use of driving tool, a gearbox or other components designed for lower extreme loads or lower extreme torsional moments. In particular, methods according to embodiments described herein may decrease the torsional moments or the rotor imbalance during installation. Embodiments may allow for a cost-efficient blade installation. For example, installation of blades may be performed at higher wind speeds. Availability of cranes or a more efficient utilization of cranes may be achieved.

According to embodiments of the present disclosure, each blade 22 includes a blade root segment 56 and a blade extension segment 66, particularly one blade root segment 56 and at least one blade extension segment 66. In some embodiments, each blade 22 includes one blade root segment 56 and one blade extension segment 66, the blade extension segment 66 particularly being a blade tip segment. In further embodiments, each blade 22 may include one blade root segment 56 and two blade extension segments 66. In embodiments, the blade root segment 56 includes the root of the blade 22. The root of the blade 22 can be configured to be mounted to a blade installation site of the rotor hub 20. In embodiments, a blade extension segment mass of a blade extension segment 66 is smaller than a blade root segment mass of a blade root segment 56. For example, the blade extension segment mass may be maximum 50% of the blade root segment mass, particularly maximum 30% or maximum 20%, and/or minimum 1% of the blade root segment mass, particularly minimum 3% or minimum 5%.

According to embodiments, the wind turbine 10 includes three blades 22, particularly a first blade 70 including a first blade root segment 50 and a first blade extension segment 60, a second blade 72 including a second blade root segment 52 and a second blade extension segment 62, and a third blade 74 including a third blade root segment 54 and a third blade extension segment 64.

Figure 3:
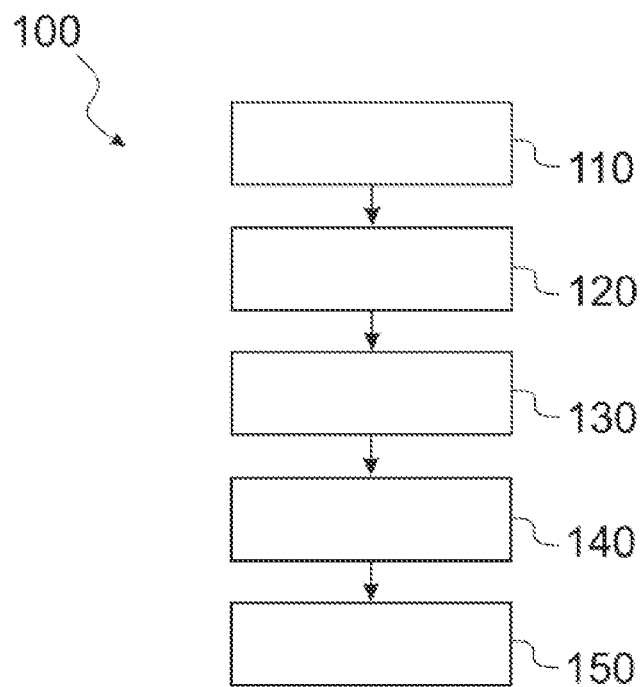
FIG. 3 illustrates a flow diagram of a method according to embodiments of the present disclosure.

According to embodiments of the present disclosure, a method 100 includes mounting a first blade root segment 50 to the rotor hub 20. Mounting the first blade root segment 50 may include lifting the first blade root segment 50 from the support surface 14 to the rotor hub 20. The first blade root segment 50, particularly the root of the first blade root segment 50, may be connected to a blade installation site of the rotor hub 20. In particular, the first blade root segment 50 may be mounted to the rotor hub 20 without a first blade extension segment 60 being connected to the first blade root segment 50. A moment resulting from the imbalance of the rotor 18 and acting on the main shaft of the wind turbine 10 may be reduced compared to a moment resulting from a full blade being mounted to the rotor hub according to conventional mounting of blades. FIG. 3 shows a flow diagram of a method 100 according to embodiments. For example, at block 110 the first blade root segment 50 is mounted to the rotor hub 20.

In some embodiments, at least one blade root segment 56 of a blade 22, particularly each of the blade root segments 56, may be connected to the rotor hub 20, while a longitudinal blade root segment axis of the blade root segment 56 is at an angle of maximum 45 degrees with respect to a horizontal plane, particularly at an angle of maximum 30 degrees, maximum 20 degrees or maximum 10 degrees. For example, the blade root segment 56 may be connected to the rotor hub 20, the longitudinal blade root segment axis being oriented at least substantially in a horizontal direction. In further embodiments, the blade root segment 56 may be connected to the rotor hub 20, while longitudinal blade root segment axis of the blade root segment 56 is at an angle larger than 45 degrees.

Figures 4A, 4B:
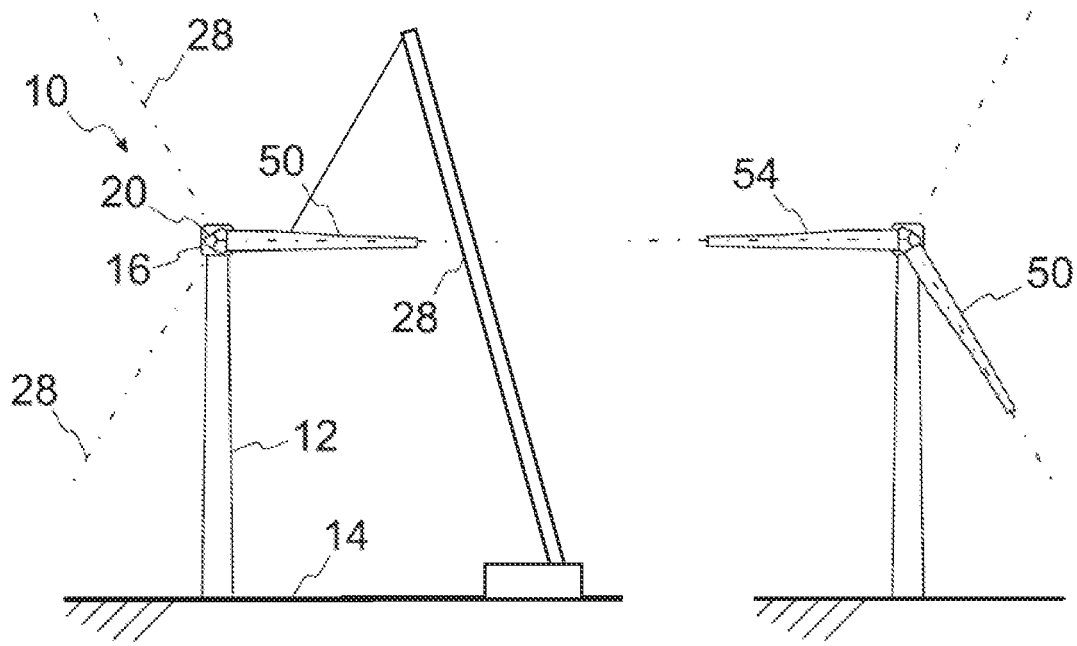
FIGS. 4A-4E illustrate schematic views of a wind turbine during mounting of blades according to embodiments.

FIGS. 4A-4E schematically illustrate mounting of the blades 22 according to embodiments. For example, in FIG. 4A the first blade root segment 50 is mounted to the rotor hub 20. In FIG. 4A the first blade root segment 50 is mounted to the rotor hub 20 with the first blade root segment 50 being oriented in a substantially horizontal direction.

In some embodiments, for example at block 120 in FIG. 3, the method 100 may include mounting a third blade root segment 54 to the rotor hub 20 after mounting the first blade root segment 50 to the rotor hub 20 and before mounting a second blade 72. In particular, the third blade root segment 54 may be mounted to the rotor hub 20 without a third blade extension segment 64 being connected to the third blade root segment 54. In further embodiments, the third blade root segment 54 may be mounted to the rotor hub 20 after mounting the second blade 72. In particular, the third blade 74 including the third blade root segment 54 with the third blade extension segment 64 being connected to the third blade root segment 54 may be mounted after mounting the second blade 72.

In FIG. 4B, the third blade root segment 54 is mounted to the rotor hub 20 after mounting the first blade root segment 50 and before mounting the second blade 72. In particular, prior to mounting the third blade root segment, the rotor including the rotor hub 20 and the first blade root segment 50 are rotated such that the third blade root segment 54 can be connected to the rotor hub 20, while the third blade root segment 54 is in a substantially horizontal orientation.

Figure 4C:
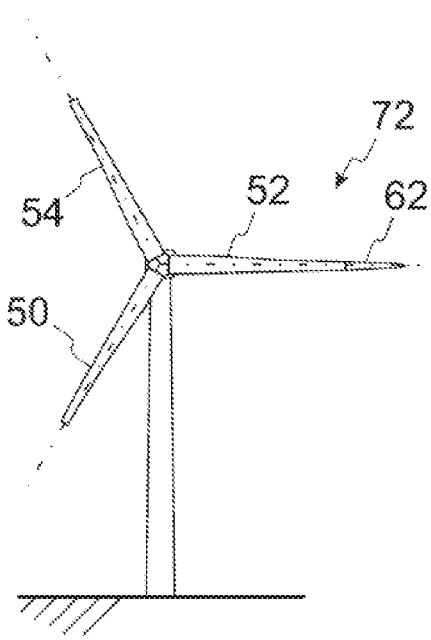

According to embodiments, the method 100 includes mounting a second blade 72 to the rotor hub 20 after mounting the first blade root segment 50, the second blade 72 including a second blade root segment 52 and a second blade extension segment 62. In particular, the second blade extension segment 62 of the second blade 72 is connected to the second blade root segment 52 before mounting the second blade 72 to the rotor hub 20. The second blade extension segment 62 of the second blade 72 may be connected to the second blade root segment 52 according to embodiments described herein, particularly by joining a first joint component 78 of the second blade root segment 52 to a second joint component 84 of the second blade extension segment 62 (see for example FIG. 6A). In embodiments, the second blade extension segment 62 may be connected to the second blade root segment 52 before lifting the second blade 72 towards the rotor hub 20 for mounting the second blade 72 to the rotor hub 20. For example, in FIG. 3 the second blade 72 is mounted at block 130 to the rotor hub 20. In FIG. 4C, the second blade 72 is mounted to the rotor hub 20. In particular, the rotor including the rotor hub 20, the first blade root segment 50 and the third blade root segment 54 is rotated such that the second blade 72 can be connected to the rotor hub 20 with a longitudinal blade axis of the second blade 72 being oriented in a substantially horizontal direction. In embodiments, the second blade root segment 52 together with the second blade extension segment 62 can be connected to the rotor hub 20 at an angle for mounting a blade root segment 56 according to embodiments described herein. Mounting the second blade root segment 56 together with the second extension segment 62 can facilitate connecting the second blade root segment 56 and the second extension segment 62, decrease assembly time and/or reduce the number of rotor motions during assembly.

According to embodiments, the method 100 includes connecting a first blade extension segment 60 to the first blade root segment 50 after mounting the second blade 72, for example at block 140 of the method of FIG. 3. Connecting the first blade extension segment 60 to the first blade root segment 50 may include lifting the first blade extension segment 60 to first blade root segment 50. Connecting the first blade extension segment 60 to the first blade root segment 50 may include joining the first blade extension segment 60 to first blade root segment 50 after lifting the first blade extension segment 60. For example, in FIG. 4D the first blade extension segment 60 is connected to the first blade root segment 50. Before connecting, the rotor including the first blade root segment 50 is rotated such that the first blade root segment 50 points in a downward direction, particularly in a substantially vertical downward direction.

Figure 4D:
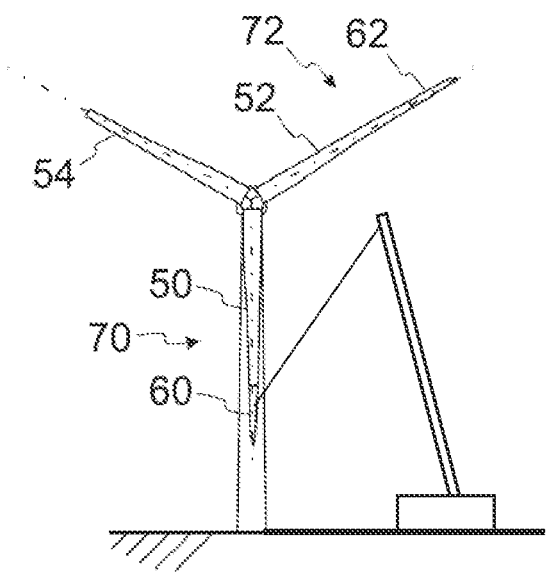
Figure 4E:
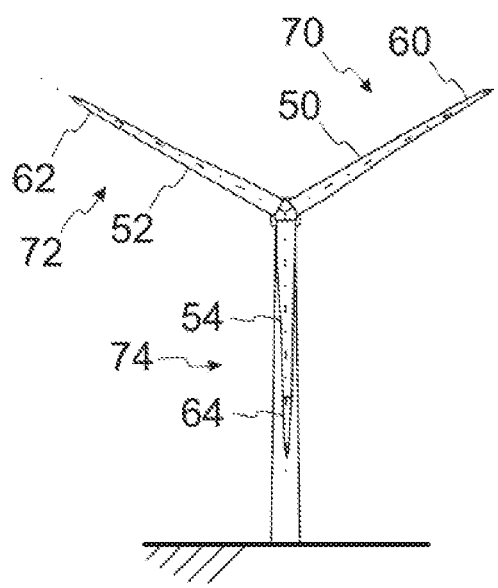

In embodiments, the method 100 can include connecting a third blade extension segment 64 to the third blade root segment 54 after mounting the second blade 72. In some embodiments, the third blade extension segment 64 may be connected after connecting the first blade extension segment 60 to the first blade root segment 50. For example, in FIG. 3 the third blade extension segment 64 is connected at block 150. In FIG. 4E, the third blade extension segment 64 is connected to the third blade root segment 54, while the third blade root segment 54 is oriented in a substantially vertical downward direction. In further embodiments, the third blade extension segment 64 may be connected to the third blade root segment 54 before connecting the first blade extension segment 60 to the first blade root segment 50.

In embodiments, the blades 22 are fully mounted after connecting the first blade extension segment 60 and connecting the third blade extension segment 64, particularly if the first blade extension segment 60 and the third blade extension segment 64 are tip segments. In further embodiments, a method of mounting blades may proceed with connecting further blade extension segments to the blade extension segments connected to the blade root segments.

In some embodiments, the first blade extension segment 60 is connected to the first blade root segment 50, while the first blade root segment 50 is oriented in a downward direction at an angle of at least 50 degrees relative to a horizontal plane and/or the third blade extension segment 64 is connected to the third blade root segment 54, while the third blade root segment 54 is oriented in a downward direction at an angle of at least 50 degrees relative to the horizontal plane. In particular, the angle may be at least 70 degrees or at least 80 degrees, for example approximately 90 degrees (FIGS. 4D and 4E). In particular, a blade root segment 56 may be understood as being oriented in a downward direction, if the root of the blade root segment 56 is pointed in an upward direction. Upward directions and downward directions may be understood relative to a direction of gravity. Upward directions and downward directions may be directed parallel to a vertical axis, the vertical axis being parallel to the direction of gravity, or may be angled relative to the vertical direction, particularly angled less than 90 degrees. In further embodiments, the angle between the first blade root segment or the third blade root segment and the horizontal plane during connecting may be less than 50 degrees. In yet further embodiments, the first blade root segment 50 and/or the third blade root segment may be oriented in an at least substantially horizontal direction. In some embodiments, the first blade root segment 50 and/or the third blade root segment may be oriented in an upward direction.

According to embodiments, mounting the first blade root segment 50 includes lifting the first blade root segment 50 to the rotor hub 20 using a first crane. In particular, the first blade root segment 50, the third blade root segment 54 and the second blade 72 may be lifted using the first crane for mounting to the rotor hub 20. For example, the first crane may be configured for mounting a blade root segment 56 or a blade 22 to the rotor hub, while the blade root segment 56 or the blade 22 is oriented in a substantially horizontal direction or at an angle with respect to the horizontal plane according to embodiments described herein, e.g. angled less than 45 degrees with respect to the horizontal plane, particularly less than 30 degrees.

In embodiments, connecting the first blade extension segment 60 can include lifting the first blade extension segment 60 to the first blade root segment 50 using a second crane, the second crane being different from the first crane. The third blade extension segment 64 may be lifted using the second crane for connecting the third blade extension segment 64 to the third blade root segment 54. In embodiments, the second crane can be smaller than the first crane, particularly smaller in height. The first crane may have a higher mass-lifting capacity than the second crane. For example, the second crane may be a cherry picker. In particular, a blade extension segment 66 may be connected to a blade root segment 56, while the blade root segment 56 is oriented in a downward direction, particularly in a substantially vertical downward direction as illustrated, e.g., in FIGS. 4D and 4E. A blade extension segment 66 may be connected to a blade root segment 56 at a lower height with respect to the support surface 14 than a height at which the blade root segment 56 is mounted to the rotor hub 20. The use of a second crane, particularly a second crane being smaller than the first crane, may reduce crane costs and/or crane time for mounting the blades, particularly crane costs and/or crane time of the first crane.

In some embodiments, a crane, particularly the second crane or a further crane, may be used for lifting assembly personnel to a blade root segment 56 mounted to the rotor hub for connecting a blade extension segment 66 to the blade root segment 56. For example, the crane may be a cherry picker. In embodiments, the crane may be used for lifting assembly personnel for connecting the first blade extension segment 60 to the first blade root segment 50, and/or for connecting the third blade extension segment 64 to the third blade root segment 54. After lifting to the blade root segment 56, the assembly personnel may join the blade extension segment 66 to the blade root segment 56, for example by joining a first joint component 78 of the blade root segment 56 to a second joint component 84 of the blade extension segment 66. In particular, the first joint component 78 and the second joint component 84 may be joined according to embodiments described herein (e.g. as shown in FIG. 6A).

According to embodiments, an extension static moment of the blade extension segment 66 of a blade 22 is at least 5%, particularly at least 10%, of a blade static moment of the blade 22 and/or maximum 50%, particularly maximum 25%, of a blade static moment of the blade 22. For example, the extension static moment may be in a range of 5% to 50% of the blade static moment, particularly in a range of 10% to 25%. The blade static moment and the extension static moment of a blade 22 may be calculated or measured particularly for the blade 22 being mounted to the rotor hub 20, the blade 22 having the blade longitudinal axis oriented in a horizontal direction.

Mounting of blades 22 according to embodiments described herein may particularly reduce moments acting on the main shaft 34 of the wind turbine 10 during mounting of the blades 22. FIG. 5 shows a graph 200 of the resulting moments 201 acting on the main shaft 34 over a mounting progress 203. In particular, the graph 200 includes a first curve 205 (dashed line) of moments during mounting according to embodiments described herein. The graph 200 further includes a second curve 207 (continuous line) of moments in conventional mounting, wherein the blades are mounted as full blades. The second curve 207 follows the mounting progress of the first curve 205, wherein in conventional mounting full blades are mounted instead of blade root segments. The moments of the first curve 205 or the second curve 207 may be calculated or measured for example in units of newton-meters (Nm).

Referring to the first curve 205 of mounting according to embodiments, at 210 of the mounting progress 203 the rotor hub 20 has been mounted. A rotor lock is engaged with a blade installation site of the rotor hub 20 in an orientation of the rotor hub 20 for mounting the first blade root segment 50 (first curve 205) or a full blade (second curve 207) to the blade installation site. In embodiments, the rotor lock of the wind turbine 10 may be configured for locking the rotor at a rotational position. The rotor lock may for example include a locking disk fixed to the main shaft 34 and rotatable with the main shaft, and a locking device for locking the locking disk at a rotational position. In particular, the locking device may be fixed within the nacelle. The locking disk may include a plurality of holes spaced in a circumferential direction around a main shaft rotation axis of the main shaft 34. The locking device may include a locking pin, the locking pin being engageable with a hole of the plurality of holes to lock the main shaft and the rotor at a rotational position.

At 212, the first blade root segment 50 (first curve 205) or the full blade (second curve 207) has been mounted to the rotor hub 20. For example, as shown in FIG. 4A, at 212 a high moment, e.g. a high positive moment, may act on the main shaft 34 and for example on the rotor lock. Compared to the conventional mounting of full blades (second curve 207), mounting according to embodiments (first curve 205) at this stage may enable a reduction of moments for example by over 10%.

At 214, the rotor lock is released. After releasing the rotor lock, the high moment may be at least partially countered by a driving tool or a rotor brake. A gearbox may be subjected to the high moment, particularly if a driving tool is configured to drive the high speed shaft. At 216, the rotor has rotated to a next rotational position for mounting the third blade root segment 54 (first curve 205) or for mounting a further full blade (second curve 207). At 218, the rotor lock is engaged. At 220, the third blade root segment 54 (first curve 205, see also FIG. 4B) or the further full blade (second curve 207) has been mounted to the rotor hub 20.

At 222, the rotor lock is released. At 224, the rotor has rotated to a next rotational position for mounting the second blade 72 (first curve 205) or for mounting a yet further full blade (second curve 207). In particular, at 224 another high absolute value of the moment is reached, particularly a high negative moment. At 226, the rotor lock is engaged. At 230, the second blade (first curve 205, see also FIG. 4C) or the yet further full blade (second curve 207) has been mounted to the rotor hub 20. At 230, the three full blades have been mounted in the conventional mounting procedure and the conventional mounting procedure may end.

At 232, the rotor lock is released. At 234 (first curve 205), the rotor has rotated to a next rotational position for connecting the first blade extension segment 60 to the first blade root segment 50. At 236, the rotor lock is engaged. At 240, the first blade extension segment 60 has been connected to the first blade root segment 50 (see also FIG. 4D).

At 242, the rotor lock is released. At 244, the rotor has rotated to a next rotational position for connecting the third blade extension segment 64 to the third blade root segment 54. In the example of FIG. 5 (see also FIG. 4D), the rotor is rotated such that the third blade extension segment points in a substantially vertical downward direction, the moment reaching approximately zero at 244. At 246, the rotor lock is engaged. At 250, the third blade extension segment 60 has been connected to the third blade root segment 54. As illustrated in FIG. 5, embodiments described herein may provide the advantage that moments acting on the main shaft, the gearbox, a rotor lock, a rotor brake, a driving tool or other components can be reduced. In particular the maximum absolute values of the moments acting in one or both rotational directions of the rotor (positive and/or negative moments) can be reduced, e.g. by over 10%.

According to some embodiments, the blade extension segment 66 of at least one of the blades 22 is connected to the blade root segment 56 of the blade 22 with a pitch angle offset relative to a pitch angle alignment of the blade root segment 56 and the blade extension segment 66 in normal operation of the wind turbine 10. In particular, the blade extension segment 66 may be connected such that an extension segment chord at a joint position between the blade root segment 56 and the blade extension segment 66 is offset by the pitch angle offset with respect to a blade root segment chord at the joint position. The blade extension segment chord may extend between a leading edge of the blade extension segment 66 and a trailing edge of the blade extension segment 66. The root segment chord may extend between a leading edge of the blade root segment 56 and a trailing edge of the blade root segment 56.

In embodiments, the pitch angle offset may be at least 30 degrees, particularly at least 45 degrees. In some embodiments, the pitch angle offset is at least 90 degrees, particularly at least 135 degrees, and/or maximum 270 degrees, particularly maximum 225 degrees. For example, the pitch angle offset may be at least substantially 180 degrees. Connecting a blade extension segment 66 of a blade 22 with a pitch angle offset may for example reduce the aerodynamic lift of the blade 22 or the aerodynamic torque of the blade 22. A weather window for mounting the blades 22 may be increased. In embodiments, the method of mounting the blades 22 may include disconnecting the blade extension segment 66 from the blade root segment 56, particularly after each of the blade root segments 56 are mounted to the rotor hub 20 and after each of the blade extension segments 66 are connected to the blade root segments 56. The method may include re-connecting the blade extension segment 66 to the blade root segment 56, wherein the blade extension segment 66 and the blade root segment 56 are aligned according to the pitch angle alignment for normal operation. In particular, disconnecting and re-connecting may be performed before starting normal operation of the wind turbine 10. Disconnecting and re-connecting may be performed for each blade 22 mounted to the rotor hub 20 with a pitch angle offset, e.g. for all three blades 22.

In some embodiments, the method may include mounting a counterweight device to a blade extension segment 66. The method may include removing the counterweight device from the blade extension segment 66. In some embodiments, the counterweight device may be static. In further embodiments, the counterweight device may be controllable. For example, a counterweight mounted to a blade extension segment 66 of a blade 22, the blade 22 being mounted to the rotor hub 20, may be controllable by pitching the blade 22. In particular, the counterweight may be rotationally asymmetric with respect to the pitch axis 28 of the blade 22. Pitching the blade 22 and the counterweight device may change a counterweight moment of the counterweight, particularly a counterweight moment acting on the main shaft 34.

Another aspect of the invention relates to a hook coupling device 88. The hook coupling device 88 may be used in a method 100 of mounting blades 22 to a rotor hub 20 according to embodiments described herein. The hook coupling device 88 may be used in other methods, particularly in methods, wherein a blade root segment 56 is mounted to a rotor hub 20 and wherein a blade extension segment 66 is connected to the blade root segment 56 after mounting the blade root segment 56 to the rotor hub 20.

According to embodiments of the present disclosure, a blade 22 includes a blade root segment 56 and a blade extension segment 66, the blade extension segment 66 being configured for connecting to the blade root segment 56. The blade extension segment 66 may be connected to an extension end section 77 of the blade root segment 56. The extension end section 77 may be a section of the blade root segment 56 at an end opposite of the root of the blade root segment 56 with respect to the longitudinal blade root segment axis.

In embodiments, the blade root segment 56, particularly the extension end section 77, includes a first joint component 78 configured for connecting to a second joint component 84 of the blade extension segment 66. The first joint component 78 and the second joint component 84 may be connected as a joint between the blade root segment 56 and the blade extension segment 66, particularly as a releasable joint. For example, the first joint component 78 and the second joint component 84 may be connected to form a flange joint, a bolted joint, a pin joint or a combination thereof. FIG. 6A exemplarily illustrates a blade extension segment 66 connected to a blade root segment 56 via a pin joint. The blade root segment 56 includes a first joint component 78 at the extension end section 77. In FIG. 6A, the first joint component 78 includes a female structural member 80 configured for receiving a male structural member 85 of the second joint component 84 of the blade extension segment 66. The female structural member 80 can include first pinholes 82. The male structural member 85 can include a second pinhole 86. When the male structural member 85 is inserted into the female structural member 80, the blade root segment 56 and the blade extension segment 66 may be mechanically interlocked by inserting a joining pin 76 into the first pinholes 82 and the second pinhole 86, e.g. in a chordwise direction. In particular, the joining pin 76 may be inserted through a pin access hatch 81 of the blade root segment 56.

In embodiments, a method, particularly a method 100 according to embodiments described herein, may include mounting a hook coupling device 88 to an extension end section 77 of a blade root segment 56. For example, one or more hook coupling device 88 may be mounted to the first blade root segment 50 and/or to the third blade root segment 54. In some embodiments, mounting the hook coupling device 88 to the extension end section 77 includes connecting a coupling joint component 90 of the hook coupling device 88 to the first joint component 78 of the extension end section 77. In particular, the first joint component 78 and the coupling joint component 90 may be connected to form a flange joint, a bolted joint, a pin joint or a combination thereof. For example, FIG. 6B illustrates an exemplary embodiment of a hook coupling device 88 mounted to the blade root segment 56 shown in FIG. 6A. The coupling joint component 90 can include a coupling joint male structural member 91 insertable into the female structural member 80 of the blade root segment 56. The coupling joint male structural member 91 may include a coupling joint pinhole 92. The hook coupling device 88 may be mechanically interlocked with the blade root segment 56 by inserting the joining pin 76 into the first pinholes 82 and the coupling joint pinhole 92.

In some embodiments, the hook coupling device 88 is mounted to the blade root segment 56 before mounting the blade root segment 56 to the rotor hub 20, particularly before lifting the blade root segment 56 to the rotor hub 20. For example, the hook coupling device 88 may be mounted to the blade root segment 56 while the blade root segment 56 is positioned on the support surface 14.

According to embodiments, the method may include hooking a hook 96 of a hoisting device 98 to the hook coupling device 88. The hoisting device 98 can include a pulling device such as a crane or a winch. The winch may be positioned on the support surface 14, e.g. on a truck on the support surface 14. The hoisting device 98 can include a hook 96. The hook 96 may be configured for hooking to the hook coupling device 88. The hook 96 may include for example a crane hook. In embodiments, the hook 96 may include an eye, a rope loop or a wire loop. In some embodiments, the hoisting device 98 can include a connecting device 97 connected to the hook 96. The connecting device 97 may be wound up by the pulling device to retract the connecting device 97 and may be wound off the pulling device to extend the connecting device 97. The pulling device can be configured for pulling the connecting device 97. "Pulling" may be understood particularly as applying a force on the connecting device 97, for example as applying a drawing force while winding up the connecting device 97 or as applying a braking force while winding off the connecting device 97. The connecting device 97 may include for example a rope, a wire, a chain or a combination thereof. In some embodiments, the hook 96 can be hooked to the hook coupling device 88 after mounting the blade root segment 56 to the rotor hub 20. In further embodiments, the hook 96 can be hooked to the hook coupling device 88 before lifting the blade root segment 56 to the rotor hub 20.

In embodiments, the method includes rotating the blade root segment 56 with respect to a rotor axis of the wind turbine 10 after mounting the blade root segment 56 to the rotor hub 20, wherein the blade root segment 56 is rotated using the hoisting device 98. In embodiments described herein, at least one blade root segment 56 of the first blade root segment 50 and the third blade root segment 54 may be rotated using the hoisting device 98. The blade root segment 56 may be rotated from a first angular position to a second angular position. The first angular position and the second angular position may be understood as angular positions relative to the rotor axis of the rotor. The blade root segment 56 may be rotated by pulling the hook coupling device 88 using the hoisting device 98.

Figure 7A:
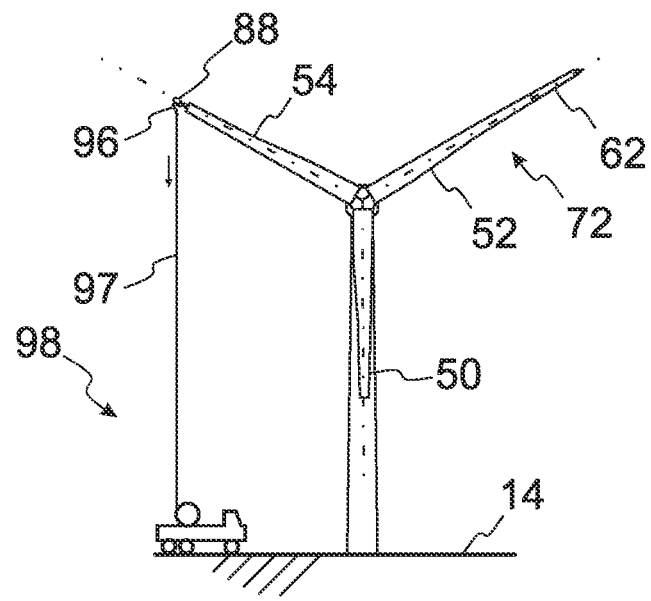
FIGS. 7A-7B illustrate schematic views of hoisting devices hooked to a hook coupling device according to embodiments.

In some embodiments, the hoisting device 98 includes a connecting device 97 connected to the hook 96 and rotating the blade root segment 56 includes pulling the connecting device 97 in a downward direction using the hoisting device 98. In particular, the connecting device 97 may be pulled downwards towards the support surface 14. The pulling device of the hoisting device 97, particularly the entire pulling device, may be positioned below the rotor, e.g. on the support surface 14. For example, FIG. 7A shows a blade root segment, particularly a third blade root segment 54, with a hook coupling device 88 mounted to the blade root segment. The hook coupling device 88 is hooked via hook 96 to the connecting device 97. The connecting device 97 is being pulled in a downward direction using the hoisting device 98. In particular, the rotor has been rotated by pulling the third blade root segment such that the first blade root segment 50 is positioned for connecting the first blade extension segment 60. In FIG. 7A, the hoisting device 98 includes a truck-mounted winch being positioned on the support surface 14. The hoisting device 98 includes a connecting device 97 and a hook 96.

Figure 7B:
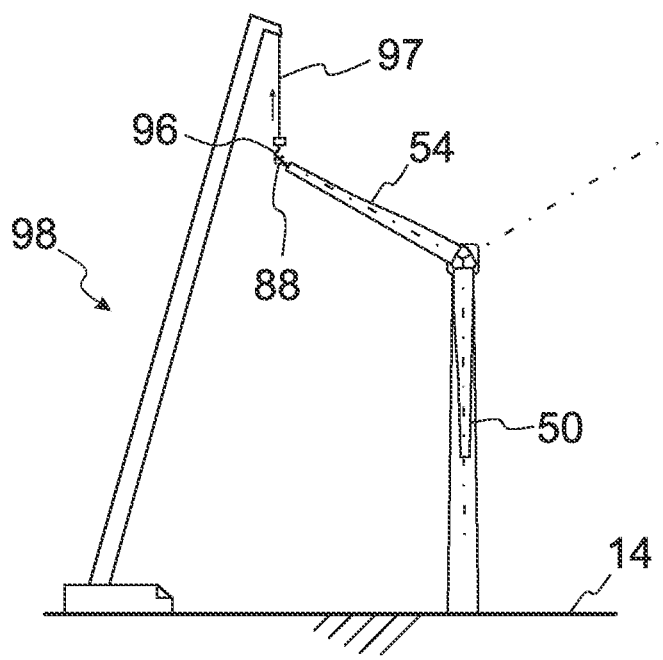

In embodiments, rotating the blade root segment 56 includes pulling the connecting device 97 in an upward direction using the hoisting device 98. In particular, the connecting device 97 may be pulled in an upward direction using a crane as a pulling device. For example, FIG. 7B shows a rotor including a blade root segment, particularly the third blade root segment 54, being rotated by pulling the connecting device 97 of the hoisting device 98 in an upward direction. In FIG. 7B, the connecting device 97 is pulled by a crane as a pulling device.

In embodiments, a method of mounting may particularly include pulling a first connecting device of a first hoisting device in an upward direction using the first hoisting device to rotate the rotor from a first angular position to a second angular position. The method may include pulling a second connecting device of a second hoisting device in a downward direction using the second hoisting device to rotate the rotor from a third angular position to a fourth angular position.

For example, the rotor may be rotated between mounting the first blade root segment 50 and mounting the third blade root segment 54 using a hook coupling device 88 mounted to the first blade root segment 50 according to embodiments described herein. In particular, the rotor may be rotated from the angular position shown in FIG. 4A to the angular position shown in FIG. 4B. The rotor may be rotated by or while pulling a connecting device in an upward direction, particularly by applying a braking force on the connecting device while lowering the first blade root segment 50. The rotor may be rotated between mounting the third blade root segment 54 and mounting the second blade 72 (FIG. 4B to FIG. 4C) by pulling a connecting device in an upward direction, the connecting device being hooked to a hook coupling device mounted to the third blade root segment 54. The rotor may be rotated between mounting the second blade 72 and connecting the first blade extension segment 60 (FIG. 4C to FIG. 4D) by pulling a connecting device hooked to the third blade root segment 54 in a downward direction. The rotor may be rotated between connecting the first blade extension segment 60 and connecting the third blade extension segment 64 (FIG. 4D to FIG. 4E) by pulling a connecting device hooked to the third blade root segment 54 in a downward direction. In embodiments, the rotor may be locked using a rotor lock in each of the angular positions for mounting a blade root segment 56 or a blade 22 to the rotor hub, or for connecting a blade extension segment 66. In embodiments, the rotor may be rotated to the angular positions and locked in angular positions without using a driving tool located in the nacelle for driving the main shaft or the high speed shaft, or the rotor may be rotated using a weaker driving tool. In some embodiments, an extreme torsional load on the gearbox may be reduced, particularly if a driving tool is used to drive the high speed shaft.

In some embodiments, the method can include pretensioning the blade root segment 56 in a first direction using a first connecting device coupled to the hook coupling device 88 and in a second direction using a second connecting device coupled to the hook coupling device 88, the first direction being different from the second direction. In particular, the blade root segment 56 can be pretensioned in the first direction by the pulling device by applying a force on the first connecting device. The blade root segment 56 can be pretensioned in the second direction by a further pulling device by applying a counterforce on the second connecting device. The pulling device and the further pulling device may include for example two winches, e.g. two winches positioned on the support surface, or a winch and a crane. For example, the blade root segment may be stabilized by pretensioning, for instance during mounting of the blade root segment to the rotor hub.

According to some embodiments, the hook coupling device 88 includes a remotely controllable locking device 94 configured for remotely controllable locking of the hook 96 to the hook coupling device 88 and/or for remotely controllable releasing of the hook 96 from the hook coupling device 88. In embodiments, the remotely controllable locking device 94 may include a locking device actuator 95 for locking the hook 96 to the hook coupling device 88. In particular, the locking device actuator 95 may be configured for actuating a gripper device 99 to lock the hook 96 to the hook coupling device 88 and/or to release the hook 96 from the hook coupling device 88. For example, FIG. 6B shows a hook coupling device 88 including a locking device actuator 95 for actuating a gripper device 99.

In embodiments, the hook coupling device 88 may include a remote control device. The remote control device may include a receiver device for receiving remote control signals. The remote control device may include a controller device configured for controlling the locking device actuator 95. The controller device may be communicatively connected to the receiver device. The controller device may be configured to control the locking device actuator 95 to lock the hook 96 in response to receiving a remote locking signal through the receiver device. The controller device may be configured to control the locking device actuator 95 to release the hook 96 in response to receiving a remote releasing signal through the receiver device. In some embodiments, the hook coupling device 88 may include an energy storage device, for example a battery, for powering the locking device actuator 95 and/or the remote control device. Remote control of the hook coupling device 88 may enable for example an efficient use of a crane for lifting blades or blade segments and for rotating the rotor.

Embodiments of the present disclosure may provide for example the advantage that during mounting of blades, extreme torsional moments on the gearbox or other components of the wind turbine such as gearbox mounts, main shaft, shrink disk, rotor lock disk, high speed shaft lock and/or bedplate can be reduced. The gearbox and/or other components may be designed for lower extreme torsional moments. Extreme loads on a driving tool for rotating the rotor during blade installation can be reduced. In particular, costs of the gearbox, of the other components and/or of the driving tool may be reduced. Embodiments may allow for blade installation under higher wind conditions, particularly extending a weather window in which a wind turbine can be assembled. Installation at higher wind conditions may particularly decrease assembly costs, e.g., crane costs or assembly personnel costs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method of mounting blades to a rotor hub of a wind turbine, the wind turbine having a tower, a nacelle mounted on the tower, the rotor hub coupled to the nacelle, and blades, wherein each blade includes a blade root segment and a blade extension segment, the method comprising:
    lifting a first blade root segment of a first blade to the rotor hub and mounting the first blade root segment to the rotor hub, the first blade having a first blade extension segment;
    lifting and mounting a second blade to the rotor hub after mounting the first blade root segment, the second blade comprising a second blade root segment and a second blade extension segment; and
    connecting the first blade extension segment to the first blade root segment after mounting the second blade.

2. The method according to claim 1, further comprising mounting a third blade root segment of a third blade to the rotor hub after mounting the first blade root segment and before mounting the second blade.

3. The method according to claim 2, further comprising connecting a third blade extension segment of the third blade to the third blade root segment after mounting the second blade.

4. The method according to claim 2, comprising one or both of:
    connecting the first blade extension to the first blade root segment while the first blade root segment is oriented in a downward direction at an angle of at least 50 degrees relative to a horizontal plane; and
    connecting the third blade extension segment to the third blade root segment while the third blade root segment is oriented in a downward direction at an angle of at least 50 degrees relative to the horizontal plane.

5. The method according to claim 1, wherein mounting the first blade root segment comprises lifting the first blade root segment to the rotor hub using a first crane, and wherein connecting the first blade extension segment comprises lifting the first blade extension segment to the first blade root segment using a second crane, the second crane being different from the first crane.

6. The method according to claim 1, wherein an extension static moment of the blade extension segment is between 5% to 50% of a blade static moment of the blade.

7. The method according to claim 1, wherein the blade extension segments are connected to the blade root segments of the blades with a pitch angle offset relative to a pitch angle alignment of the blade root segment and the blade extension segment in normal operation of the wind turbine.

8. The method according to claim 7, wherein the pitch angle offset is between 90 degrees and 270 degrees.

9. The method according to claim 1, wherein for the blades being mounted, further comprising:
    mounting a hook coupling device to an extension end section of the respective blade root segment; and
    hooking a hook of a hoisting device to the hook coupling device.

10. The method according to claim 9, wherein for the blades being mounted, further comprising using the hoisting device to rotate the blade root segment with respect to a rotor axis of the wind turbine after mounting the blade root segment to the rotor hub.

11. The method according to claim 10, wherein the hoisting device includes a connecting device connected to the hook, and wherein rotating the blade root segment comprises pulling the connecting device in a downward direction using the hoisting device.

12. The method according to claim 9, wherein the extension end section comprises a first joint component configured to connect to a second joint component of the blade extension segment, and wherein mounting the hook coupling device to the extension end section comprises connecting a coupling joint component of the hook coupling device to the first joint component.

13. The method according to claim 9, wherein the hook coupling device includes a remotely controllable locking device to lock the hook coupling device and to release the hook from the hook coupling device.

14. The method according to claim 9, wherein the hook coupling device is mounted to the blade root segment before mounting the blade root segment to the rotor hub.

15. The method according to claim 9, further comprising pretensioning the blade root segment in a first direction using a first connecting device coupled to the hook coupling device and in a second different direction using a second connecting device coupled to the hook coupling device.

* * * * *